J. S. WESTHAFER.
TOOTHBRUSH.
APPLICATION FILED JULY 29, 1918.
1,340,093. Patented May 11, 1920.
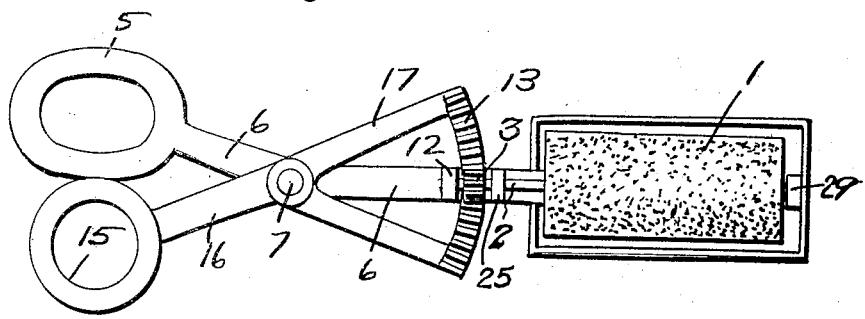
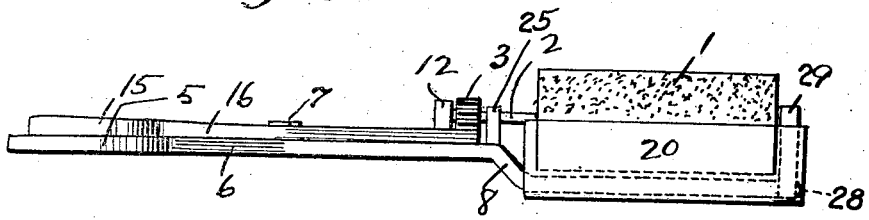
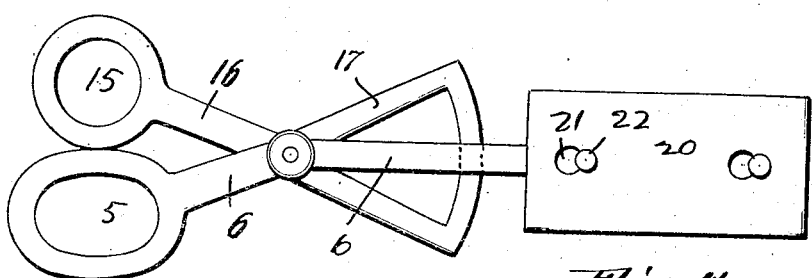
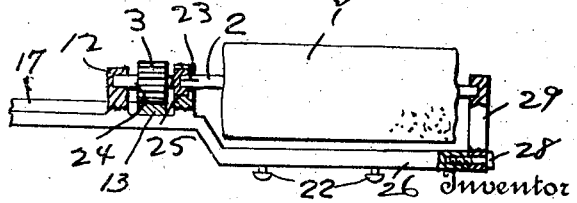
WITNESSES
Inventor
James S. Westhafer,
By
Attorney

UNITED STATES PATENT OFFICE.

JAMES S. WESTHAFER, OF BRAMAN, OKLAHOMA.

TOOTHBRUSH.

1,340,093.	Specification of Letters Patent.	Patented May 11, 1920.

Application filed July 29, 1918. Serial No. 247,280.

*To all whom it may concern:*

Be it known that I, JAMES S. WESTHAFER, a citizen of the United States, residing at Braman, in the county of Kay and State of Oklahoma, have invented certain new and useful Improvements in Toothbrushes, of which the following is a specification.

This invention relates to brushes, and more especially to those which are rotary; and the object of the same is to produce a toilet instrument or implement comprising a brush having a rotary head and a scissor-like structure for imparting motion thereto.

Another object is to provide a hood or guard for protecting the lips and tongue from the brush when it is in the mouth.

Another object is to provide means for replacing the brush when it is worn.

These and other objects are accomplished by the construction hereinafter described and claimed and shown in the drawings wherein:—

Figure 1 is a plan view of this device complete,

Fig. 2 is an edge elevation thereof,

Fig. 3 is a bottom plan view, and

Fig. 4 is a sectional detail of the device.

In the drawings the numeral 1 designates a cylindrical brush rigidly mounted on a short shaft 2 through its center. The operating mechanism is of scissor-type. That is to say, the handle 5 has a shank 6 extending past the main pivot 7, preferably dropped slightly as at 8, continued as shown at 26 beneath the brush 1. The other member has a handle 15 and a shank 16 carried past the main pivot and then forked as shown at 17, the fork arms being connected by a curved rack 13, underlying and engaging the pinion 3. Adjacent said rack a block 12 rises from the shank 6 and affords an inner bearing for the shaft 2 as will be hereinafter explained. When now the handles are moved apart and then toward each other simulating the action with an ordinary pair of scissors or shears, the rack bar 13 is reciprocated across the pinion 3 and the latter is oscillated. A guard or hood 20 preferably overlies the dropped portion of the main shank as seen in Figs. 1 and 2, and this hood may be provided with key-hole openings 21 engaging headed studs 22 as best seen in Fig. 3, or any other suitable means may be provided for fastening the hood on the dropped portion of the main shank removably or permanently if desired. The utility of the hood is, as is obvious, to protect the lips and tongue from the brush when the latter is in the mouth and being rapidly rotated to and fro by manipulating the driving mechanism as above described. The hood need not necessarily be removable but I prefer it removable when the following detail is employed.

The brush 1 has its shaft 2 squared at its extremity as at 23. The pinion 3 is mounted on a short shaft 24 of its own, one trunnion being mounted in the bearing in the block 12 as above described and the other trunnion in a separate block 25, and this trunnion is provided with a squared socket to receive the squared end 23 of the shaft 2. The upturned end 29 at the outer extremity of the underlying shank 26 is detachably connected therewith as by means of a screw 28. When now it is desired to remove the brush, as for replacing it with another or substituting one which is not worn, the set screw 28 and the upturned end 29 of the shank are removed, and the squared end 23 of the shaft 2 is drawn out of the socket in the pinion shaft 24 in a manner which will be clear. Another brush and its shaft are then substituted, and the parts restored to the position shown, after which the hood 20 is applied and the device is used as before described.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent, is:—

In a rotary tooth brush, the combination with operating mechanism of scissor type, the shank of one member thereof being forked and carrying a rack bar and the shank of the other member having a pair of alined bearings and dropped beyond said bearings, a third bearing in line with the others, and means for detachably connecting this bearing with the dropped portion of the shank; of a rotary tooth brush, a shaft fixed therethrough and having one trunnion mounted in the last-named bearing and its other trunnion squared and projecting into one of the first-named bearings, a pinion engaging said rack bar, and a pinion-shaft fast therethrough and mounted in said first-named bearings, one end of this shaft being provided with a squared socket, for the purpose set forth.

In testimony whereof I affix my signature in presence of two witnesses.

JAMES S. WESTHAFER.

Witnesses:
E. H. EMMERSON,
ELMER E. GRIFFIN.